(12) United States Patent
Huang et al.

(10) Patent No.: US 8,570,310 B2
(45) Date of Patent: Oct. 29, 2013

(54) DISPLAY PANEL

(75) Inventors: Jiun-Jr Huang, Yilan County (TW);
Chin-Hai Huang, Taoyuan County (TW); Hui-Mei Hu, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 315 days.

(21) Appl. No.: 13/081,515

(22) Filed: Apr. 7, 2011

(65) Prior Publication Data
US 2012/0194490 A1 Aug. 2, 2012

(30) Foreign Application Priority Data

Jan. 31, 2011 (TW) .............................. 100103733 A

(51) Int. Cl.
*G06F 3/038* (2013.01)
*G09G 5/00* (2006.01)
(52) U.S. Cl.
USPC .......................................... 345/206; 349/113

(58) Field of Classification Search
USPC ................................... 345/206; 349/113, 114
See application file for complete search history.

(56) References Cited

U.S. PATENT DOCUMENTS

| 2008/0030661 A1* | 2/2008 | Tung et al. ..................... 349/114 |
| 2010/0044716 A1* | 2/2010 | Lo et al. .......................... 257/72 |

* cited by examiner

*Primary Examiner* — Kevin M Nguyen
(74) *Attorney, Agent, or Firm* — Jianq Chyun IP Office

(57) ABSTRACT

A display panel have a transmissive region and a reflective region. The display panel comprises a first plate, a second plate opposite to the first plate and a display medium. The first plate comprises a first substrate, a scan line, a data line, an active device, a common electrode, a pixel electrode and a dielectric layer. The active device is electrically connected to the scan line and the data line. The pixel electrode is electrically connected to the active device and is electrically insulated from the common electrode. The pixel electrode has slits exposing the common electrode. The dielectric layer is located between the common electrode and the pixel electrode and has first openings in the reflective region. The second plate is opposite to the first plate. The display medium is located between the first plate and the second plate.

16 Claims, 5 Drawing Sheets

DISPLAY PANEL

CROSS-REFERENCE TO RELATED APPLICATION

This application claims the priority benefit of Taiwan application serial no. 100103733, filed Jan. 31, 2011. The entirety of the above-mentioned patent application is hereby incorporated by reference herein and made a part of this specification.

BACKGROUND OF THE INVENTION

1. Field of Invention

The present invention relates to a display panel. More particularly, the present invention relates to a display panel operating in fringe field switching mode.

2. Description of Related Art

When the user uses a transmissive liquid crystal display in the outdoor environment, it is hard to perceive the image displayed by the display because of the high light intensity of the ambient light. Hence, the reflective liquid crystal display is developed to overcome the problem mentioned above. However, it is still not easy for the user to perceive the image displayed by the reflective liquid crystal display in the dim indoor environment due to lack of brightness of the reflective liquid crystal display.

To provide a high quality display result to the user no matter the light intensity of the ambient light is high or low, a transflective liquid crystal display is developed. Generally speaking, the transflective liquid crystal displays can be classified into single cell gap transflective liquid crystal displays and dual cell gap transflective liquid crystal displays. The manufacture process of the dual cell gap transflective liquid crystal displays is complicated and expansive. Further, the single cell gap transflective liquid crystal displays suffer from that the driving voltage-transmittance curve (V-T curve) of the reflective region is incompatible with the driving V-T curve of the transmissive region. Accordingly, how to develop a kind of transflective liquid crystal display having the driving V-T curve of the reflective region compatible with the driving V-T curve of the transmissive region become one of the development subjects.

SUMMARY OF THE INVENTION

The invention provides a display panel capable of resolving the problem of the conventional single cell gap transflective liquid crystal display that the driving V-T curve of the reflective region is incompatible with the driving V-T curve of the transmissive region.

The invention provides a display panel having a transmissive region and a reflective region. The display panel comprises a first plate, a second plate and a display medium. The first plate comprises a first substrate, a scan line, a data line, an active device, a common electrode, a pixel electrode and a dielectric layer. The scan line, the data line and the common electrode are located on the first substrate. The active device is electrically connected to the scan line and the data line. The pixel electrode is electrically connected to the active device and is electrically insulated from the common electrode. The pixel electrode has slits exposing the common electrode. The dielectric layer is located between the common electrode and the pixel electrode. The dielectric layer has first openings in the reflective region. The second plate is opposite to the first plate and the display medium is located between the first plate and the second plate.

Accordingly, through the first openings in the reflective region, the rotation angle of the display medium in the reflective region is different from the rotation angle of the display medium in the transmissive region. Therefore, the problem of the conventional single cell gap transflective liquid crystal display that the driving V-T curve of the reflective region is incompatible with the driving V-T curve of the transmissive region can be overcome.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
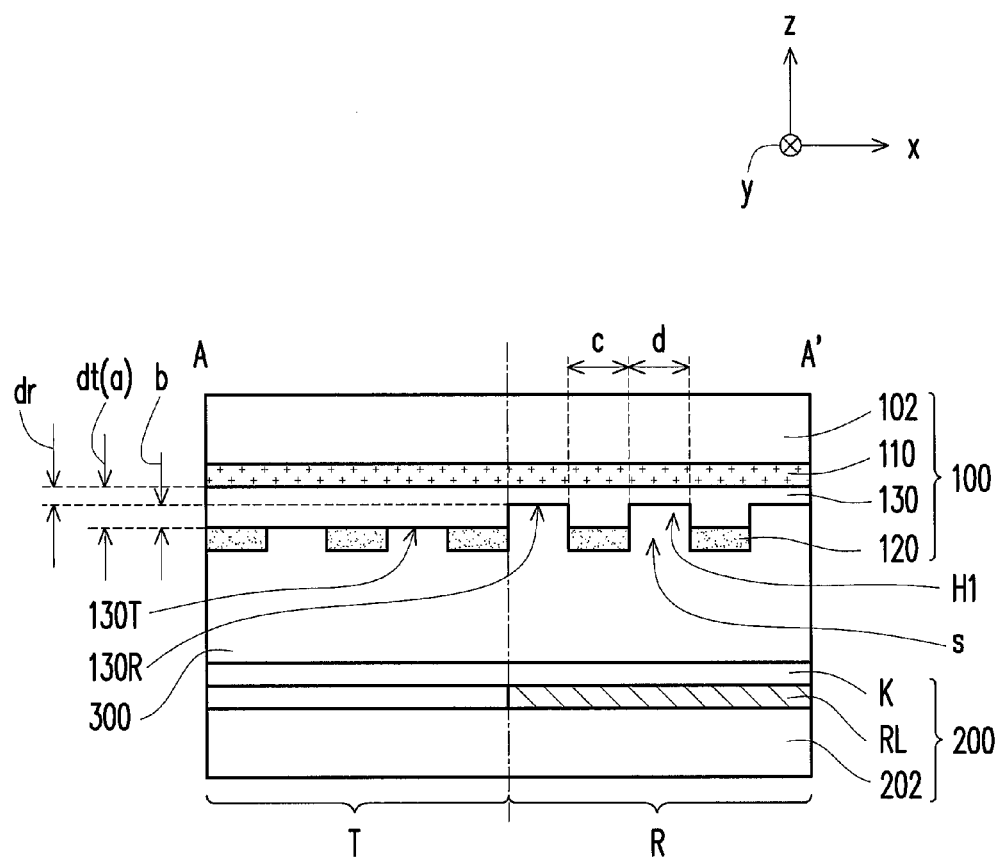
FIG. 1, FIG. 3, FIG. 4, FIG. 5 and FIG. 6 are cross-sectional views of a display panel according to one embodiment of the present invention.
Figure 2A:
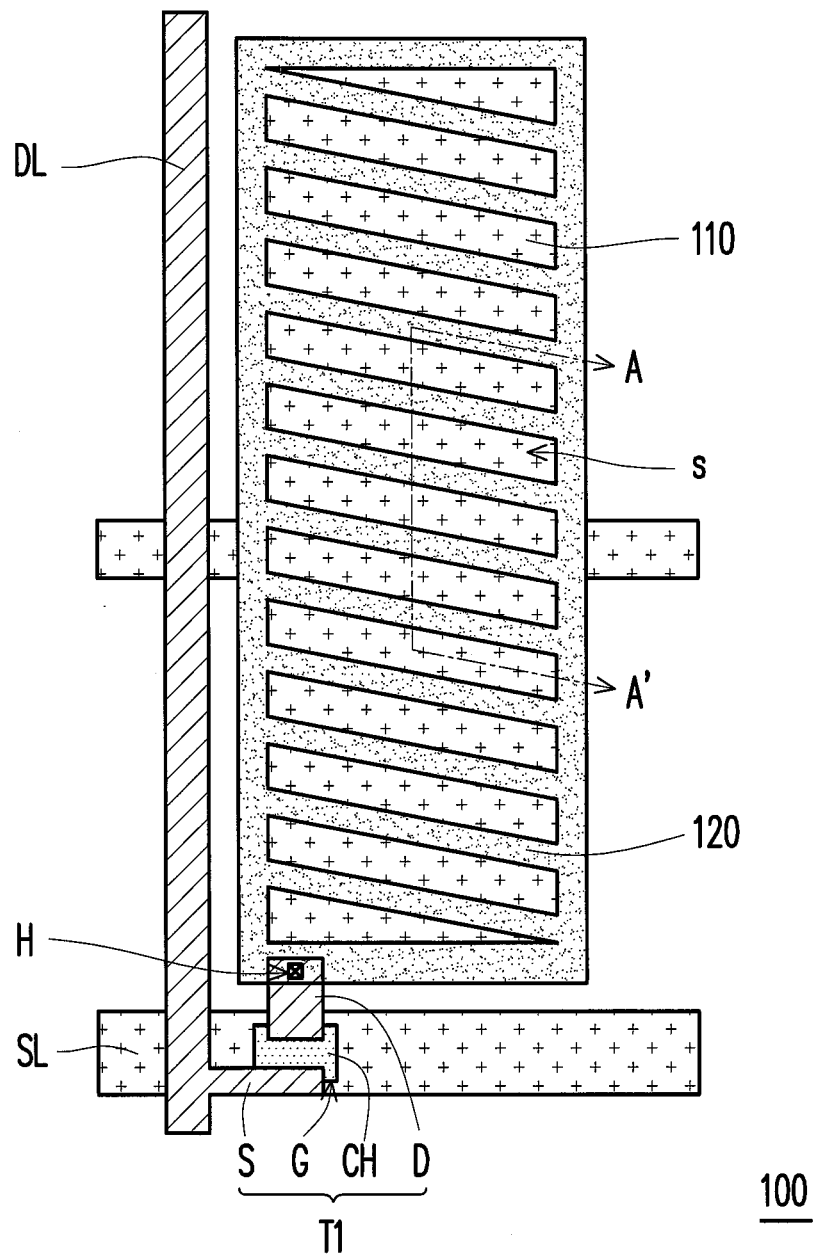
FIG. 2A is a top view of a first plate of the display panel shown in FIG. 1.
Figure 2B:
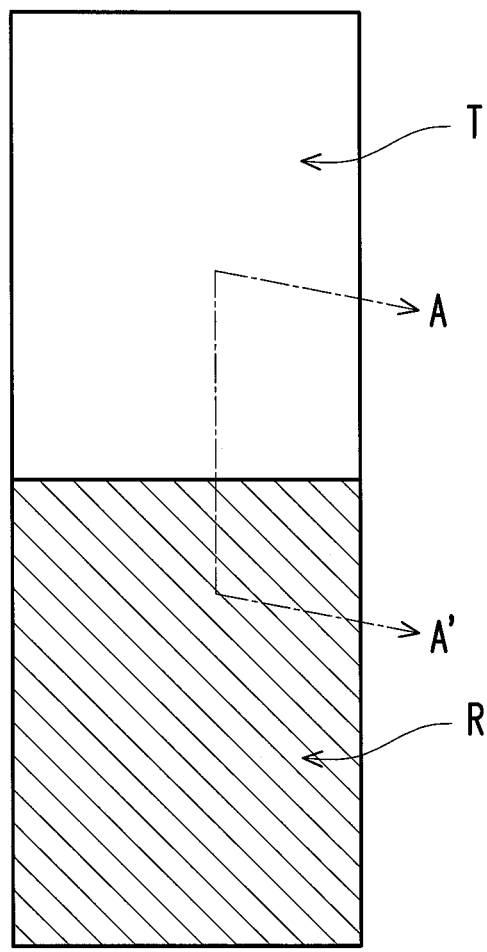
FIG. 2B is a top view of a second plate of the display panel shown in FIG. 1.

FIG. 1 is a cross-sectional view of a display panel according to one embodiment of the present invention. FIG. 2A is a top view of a first plate of the display panel shown in FIG. 1. FIG. 2B is a top view of a second plate of the display panel shown in FIG. 1. It should be noticed that FIG. 1 is the cross-sectional view along line A-A' in both of FIG. 2A and FIG. 2B. Moreover, the drawings only show one of the pixels of the display panel for describing the present invention. Generally, the display panel is comprised of several pixels arranged in an array and the people skilled in the art can fully understand the structure of the display panel of the present invention according to the specification of the present invention and the descriptions of the drawings of the present invention.

As shown in FIG. 1, FIG. 2A and FIG. 2B, a display panel of the present embodiment has a transmissive region T and a reflective region R. Further, the display panel comprises a first plate 100, a second plate 200 and a display medium 300 between the first plate 100 and the second plate 200. In the present embodiment, the display medium 300 comprises liquid crystal molecules, electrophoresis display medium or other adequate medium. The liquid crystal molecules are used as an exemplar of the display medium in the following embodiments of the present invention and the present invention is not limited thereto.

The first plate 100 comprises a first substrate 102, a scan line SL, a data line DL, an active device T1, a common electrode 110, a pixel electrode 120 and a dielectric layer 130. In the present embodiment, the first substrate 102 is used to carry the elements of the first plate 100 and is made of glass, quartz, organic polymer or other adequate material.

The scan line SL and the data line DL are disposed on the first substrate 102. The scan line SL and the data line DL are interlaced each other. On the other words, the extending direction of the data line DL is not parallel to the extending direction of the scan line SL. Preferably, the extending direction of the data line DL is perpendicular to the extending direction of the scan line SL. Moreover, the scan line SL and the data line DL belong to different film layers. Concerning about the electrical conductivity, the scan line SL and the data line DL are generally made of metal materials. However, the present invention is not limited to the material mentioned above. According to other embodiments, the scan line SL and the data line DL can be made of other conductive materials, such as alloy, nitride of metal material, oxide of metal material, oxy-nitride of metal material or the stacked layers of metal materials and other conductive materials.

The active device T1 is electrically connected to the scan line SL and the data line DL. More specifically, the active device T1 comprises a gate G, a channel CH, a source S and a drain D. A portion of the scan line SL is used as the gate G. The channel CH is located above the gate G. The source S and the drain D are located above the channel CH. In the above description, a bottom gate thin film transistor is used as an exemplar of the active device T1 and the present invention is not limited thereto. According to the other embodiments, the aforementioned active device T1 can be a top gate thin film transistor or a multi-gate thin film transistor.

The common electrode 110 is disposed on the first substrate 102. According to the present embodiment, the common electrode 110 and the scan line SL belong to the same film layer. However, the present invention is not limited to the above arrangement. The common electrode 110 of the present embodiment can be, for example, transparent conductive layer comprising metal oxide such as indium tin oxide, indium zinc oxide, aluminum tin oxide, aluminum zinc oxide, indium gallium zinc oxide, other adequate oxide or the stacked layers of at least two of the aforementioned materials.

The pixel electrode 120 is disposed on the first substrate 102 and is electrically connected to the drain D of the active device T1 through the contact window H. The pixel electrode 120 is electrically insulated from the common electrode 110. The pixel electrode 120 has a plurality of slit s exposing the common electrode 110. The pixel electrode 120 can be, for example, a transparent conductive layer comprising metal oxide, such as indium tin oxide, indium zinc oxide, aluminum tin oxide, aluminum zinc oxide, indium gallium zinc oxide, other adequate oxide or the stacked layers of at least two of the aforementioned materials.

As shown in FIG. 1, the dielectric layer 130 is located between the common electrode 110 and the pixel electrode 120. The dielectric layer 130 has a plurality of first openings H1 in the reflective region R. In the present embodiment, each of the first openings H1 can respectively overlap each of the slits s in the in the reflective region R. More specifically, the first openings H1 of the present embodiment align with the slits s in the reflective region R respectively. In the present embodiment, the dielectric layer 130 can be made of inorganic material (such as silicon oxide, silicon nitride, silicon oxy-nitride or the staked layers of at least two of the aforementioned materials), organic material or the combination thereof.

It should be noticed that the dielectric layer 130 has a first surface 130R at the first openings H1 and has a second surface 130T in the transmissive region T. The distance dr between the first surface 130R and the common electrode 110 is smaller than the distance dt between the second surface 130T and the common electrode 110. On the other words, the thickness of the dielectric layer 130 in the transmissive region T along the z direction is different from the thickness of the dielectric layer 130 in the reflective region R along the z direction. Therefore, when the driving voltage is applied on the common electrode 110 and the pixel electrode 120, the power line distribution in the reflective region R is different from the power line distribution in the transmissive region T. Hence, the rotation angle of the display medium 300 in the reflective region R is different from the rotation angle of the display medium 300 in the transmissive region T so that the problem of the conventional single cell gap transflective liquid crystal display that the driving V-T curve of the reflective region is incompatible with the driving V-T curve of the transmissive region can be overcome.

Moreover, the thickness of the dielectric layer 130 in the transmissive region T denoted as a, the depth of each of the openings H1 denoted as b, the dimension of the space between the adjacent openings H1 denoted as c and the width of each of the openings H1 denoted as d can be properly designed to improve the performance of the display panel of the present embodiment. For instance, the thickness a of the dielectric layer 130 in the transmissive region T can be larger than or equal to 6000 angstroms and the depth b of each of the first openings H1 satisfies $(\frac{1}{3}) \leq (b/a) \leq (\frac{1}{2})$. The dimension c of the space between the adjacent openings H1 and the width d of each of the first openings H1 satisfy $0.5 \leq (c/d) \leq 1.5$. However, the present invention is not limited to the aforementioned measurements.

Figure 3:
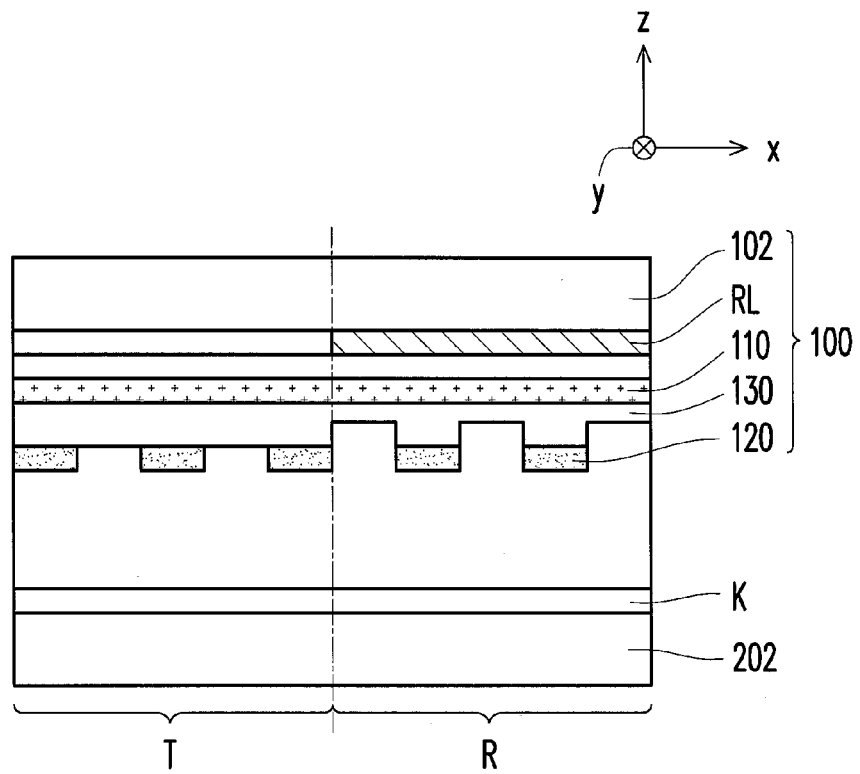

As shown in FIG. 1, the second plate 200 is opposite to the first plate 100. The second plate 200 of the present embodiment comprises a second substrate 202 and a reflective layer RL. The reflective layer RL is located on the second substrate 202 in the reflective region R. However, the present invention is not limited to the aforementioned arrangement. As shown in FIG. 3, in other embodiments, the reflective layer RL can be also located on the first substrate 102 in the reflective region R. Moreover, in the present embodiment, a phase retarder K can be optionally disposed on the second substrate 202 to further improve the optical performance of the display panel of the present embodiment.

In the aforementioned embodiment shown in FIG. 1, the locations of the first openings H1 are corresponding to the locations of the slits s. Through these first openings H1, the power line distribution in the reflective region R is different from the power line distribution in the transmissive region T. Therefore, the problem of the conventional single cell gap transflective liquid crystal display that the driving V-T curve of the reflective region is incompatible with the driving V-T curve of the transmissive region can be overcome. However, the present invention is not limited to the arrangement mentioned above. Other feasible embodiments of the present invention are described hereafter.

Figure 4:
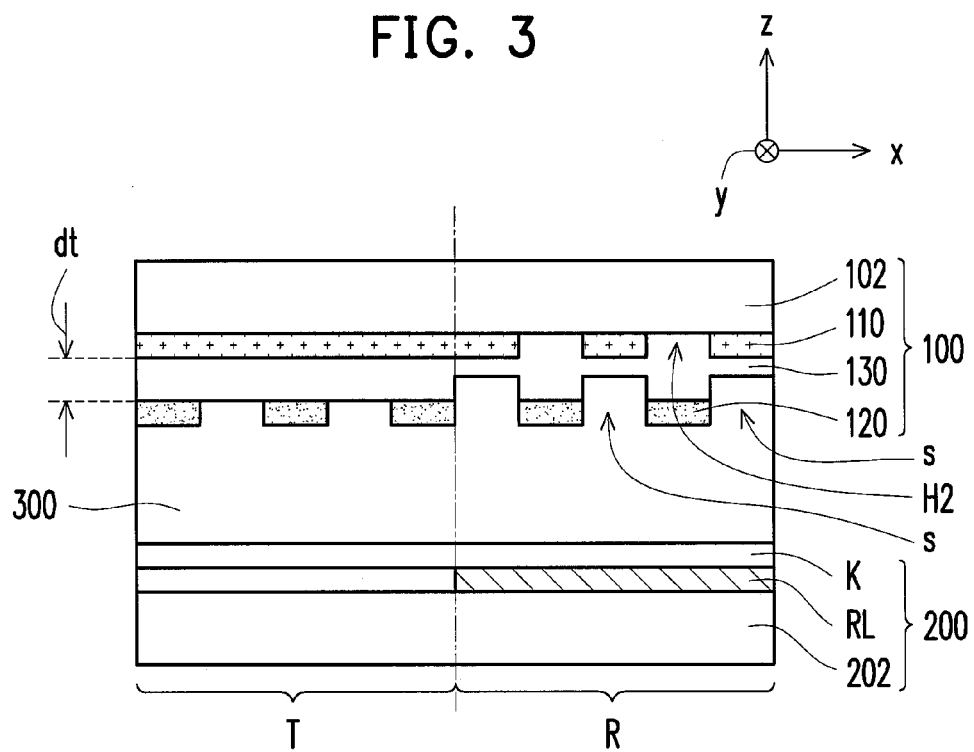

FIG. 4 is a cross-sectional view of a display panel according to another embodiment of the present invention. The embodiment shown in FIG. 4 is similar to the embodiment shown in FIG. 1 so that the same elements are labeled with the same reference numbers and are not described again. The embodiment shown in FIG. 4 is different from the embodiment shown in FIG. 1 in that the common electrode 110 has a plurality of second openings H2 in the reflective region R, the dielectric layer 130 fills in the second openings H2 and the second openings H2 overlap the pixel electrode 120. More clearly, the second openings H2 can be through holes and each of the through holes is located between any two adjacent slits s in the reflective region R. Because of the design of the aforementioned display panel, the power line distribution in the reflective region R is different from the power line distribution in the transmissive region T. Thus, the rotation angle of the display medium 300 in the transmissive region T is different from the rotation angle of the display medium 300 in the reflective region R so that the problem of the conventional single cell gap transflective liquid crystal display that the driving V-T curve of the reflective region is incompatible with the driving V-T curve of the transmissive region can be overcome. It should be noticed that, in the aforementioned design of the display panel, the thickness dt of the dielectric layer 130 in the transmissive region T is smaller than or equal to 6000 angstroms, preferably.

Figure 5:
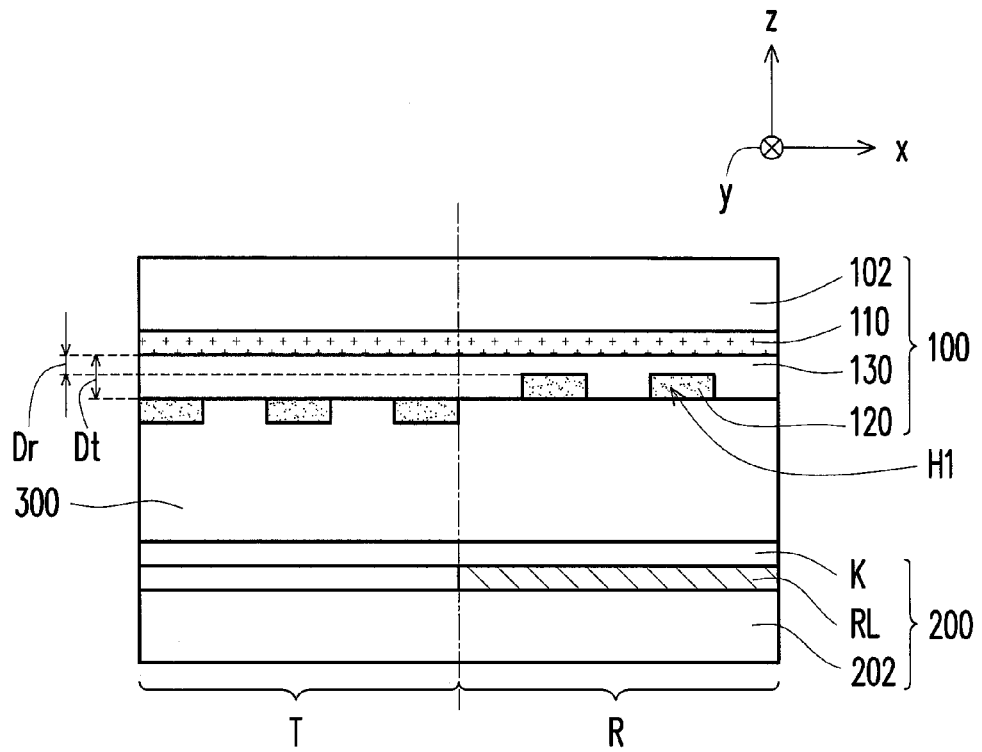

FIG. 5 is a cross-sectional view of a display panel according to another embodiment of the present invention. The embodiment shown in FIG. 5 is similar to the embodiment shown in FIG. 1 so that the same elements are labeled with the same reference numbers and are not described again. The embodiment shown in FIG. 5 is different from the embodiment shown in FIG. 1 in that the pixel electrode 120 in the reflective region R fills in the first openings H1. On the other words, the thickness Dt of the dielectric layer 130 in the transmissive region T along the z direction is different from the thickness Dr of a part of the dielectric layer 130 in the reflective region R along the z direction. Accordingly, when the driving voltage is applied on the common electrode 110 and the pixel electrode 120, the rotation angle of the display medium 300 in the reflective region R is different from the rotation angle of the display medium 300 in the transmissive region T so that the problem of the conventional single cell gap transflective liquid crystal display that the driving V-T curve of the reflective region is incompatible with the driving V-T curve of the transmissive region can be overcome.

Figure 6:
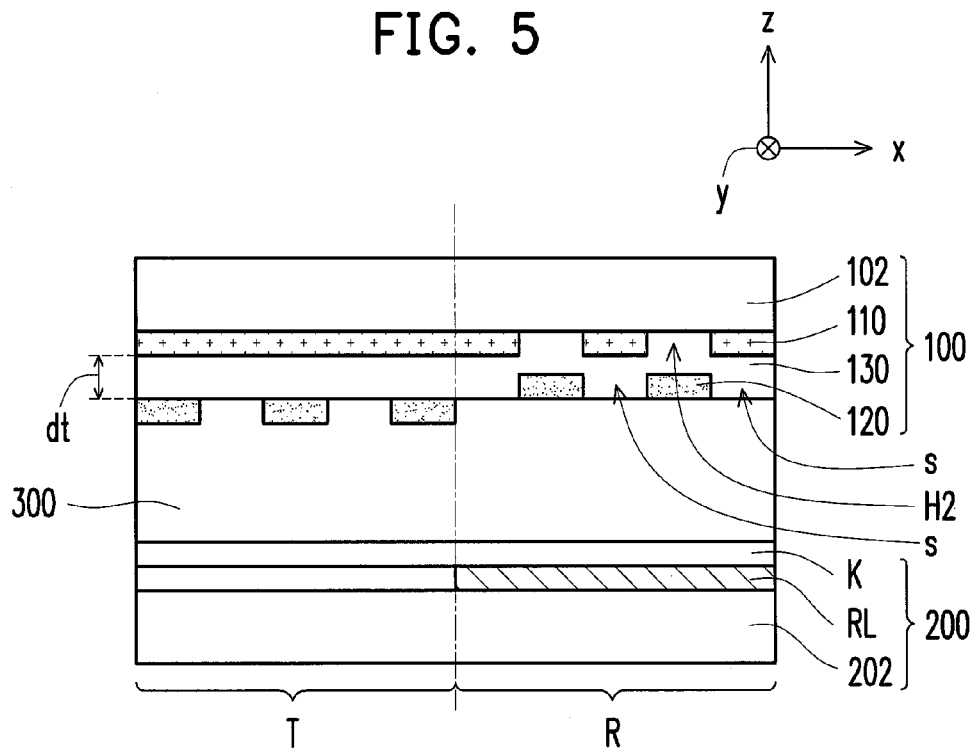

FIG. 6 is a cross-sectional view of a display panel according to the other embodiment of the present invention. The embodiment shown in FIG. 6 is similar to the embodiment shown in FIG. 5 so that the same elements are labeled with the same reference numbers and are not described again. The embodiment shown in FIG. 6 is different from the embodiment shown in FIG. 5 in that the common electrode 110 in the reflective region R has a plurality of second openings H2, the dielectric layer 130 fills in the second openings H2 and the second openings H2 overlap the pixel electrode 120. More clearly, the second openings H2 can be through holes and each of the through holes is located between any two adjacent slits s in the reflective region R. Similarly, the aforementioned design of the display panel can overcome the problem of the conventional single cell gap transflective liquid crystal display that the driving V-T curve of the reflective region is incompatible with the driving V-T curve of the transmissive region. It should be noticed that, in the aforementioned design of the display panel, the thickness dt of the dielectric layer 130 in the transmissive region T is smaller than or equal to 6000 angstroms, preferably.

Altogether, in the display panel of the present invention, through the first openings in the reflective region, the rotation angle of the display medium in the reflective region is different from the rotation angle of the display medium in the transmissive region. Therefore, the problem of the conventional single cell gap transflective liquid crystal display that the driving V-T curve of the reflective region is incompatible with the driving V-T curve of the transmissive region can be overcome.

Moreover, by properly designing the thickness of the dielectric layer in the transmissive region, the depth of each of the first openings, the dimension of the space between the adjacent first openings and the width of each of the first openings, the performance of the display panel can be further improved.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A display panel having a transmissive region and a reflective region, the display panel comprising:
   a first plate comprising:
      a first substrate;
      a scan line and a data line, wherein the scan line and the data line are located on the first substrate;
      an active device electrically connected to the scan line and the data line;
      a common electrode located on the first substrate;
      a pixel electrode electrically connected to the active device and electrically insulated from the common electrode, wherein the pixel electrode has at least a slit exposing the common electrode; and
      a dielectric layer located between the common electrode and the pixel electrode, wherein the dielectric layer has at least a first opening in the reflective region;
   a second plate opposite to the first plate, wherein the second plate has a second substrate; and
   a display medium located between the first plate and the second plate, wherein the slit overlaps the first opening in the reflective region.

2. The display panel of claim 1, wherein the dielectric layer has a first surface at the first opening, the dielectric layer has a second surface in the transmissive region and a distance between the first surface and the common electrode is smaller than a distance between the second surface and the common electrode.

3. The display panel of claim 1, wherein the slit aligns the first opening in the reflective region.

4. The display panel of claim 1, wherein a thickness of the dielectric layer in the transmissive region is larger than or equal to 6000 angstroms.

5. The display panel of claim 1, wherein the common electrode has a second opening in the reflective region, the dielectric layer fills in the second opening and the second opening overlaps the pixel electrode.

6. The display panel of claim 5, wherein the second opening is a through hole.

7. The display panel of claim 5, wherein a thickness of the dielectric layer in the transmissive region is smaller than or equal to 6000 angstroms.

8. The display panel of claim 1, wherein a thickness of the dielectric layer in the transmissive region is denoted as a, a depth of the first opening is denoted as b, and a and b satisfy $(1/3) \leq (b/a) \leq (1/2)$.

9. The display panel of claim 1, wherein a dimension of a space between two adjacent first openings is denoted as c, a width of the first opening is denoted as d, and c and d satisfy $0.5 \leq (c/d) \leq 1.5$.

10. The display panel of claim 1, wherein the second plate further comprises a reflective layer on the second substrate in the reflective region.

11. The display panel of claim 1, wherein the first plate further comprises a reflective layer on the first substrate in the reflective region.

12. The display panel of claim 1, further comprising a phase retarder located on the second substrate.

13. A display panel having a transmissive region and a reflective region, the display panel comprising:
   a first plate comprising:
      a first substrate;
      a scan line and a data line, wherein the scan line and the data line are located on the first substrate;

an active device electrically connected to the scan line and the data line;

a common electrode located on the first substrate;

a pixel electrode electrically connected to the active device and electrically insulated from the common electrode, wherein the pixel electrode has at least a slit exposing the common electrode; and a dielectric layer located between the common electrode and the pixel electrode, wherein the dielectric layer has at least a first opening in the reflective region;

a second plate opposite to the first plate, wherein the second plate has a second substrate; and a display medium located between the first plate and the second plate, wherein the pixel electrode in the reflective region fills in the first opening, and the common electrode has a second opening in the reflective region, the dielectric layer fills in the second opening and the second opening overlaps the pixel electrode.

14. The display panel of claim 13, wherein a thickness of the dielectric layer in the transmissive region is larger than or equal to 6000 angstroms.

15. The display panel of claim 13, wherein the second opening is a through hole.

16. The display panel of claim 13, wherein a thickness of the dielectric layer in the transmissive region is smaller than or equal to 6000 angstroms.

* * * * *